May 18, 1937. H. BEEBE 2,081,083
HITCH
Filed Oct. 12, 1936
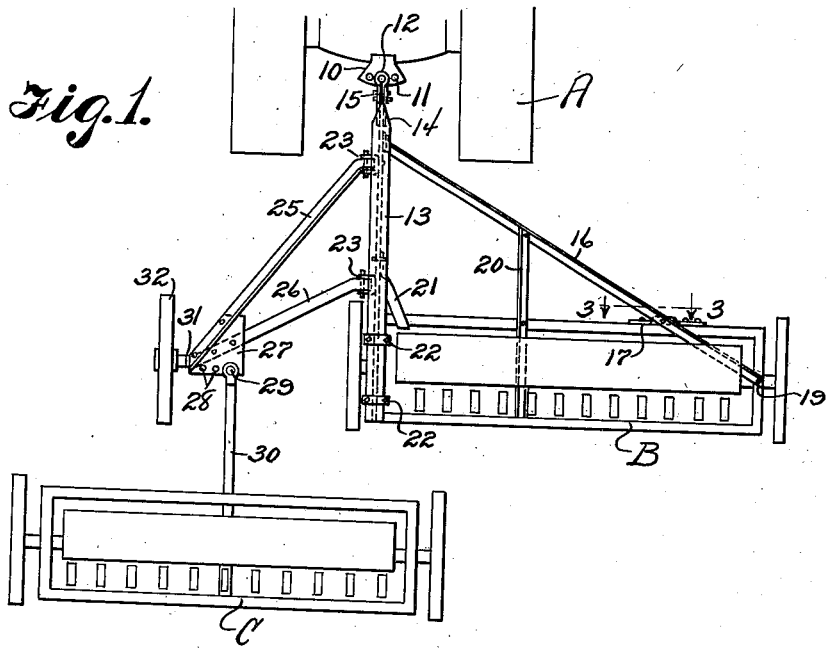
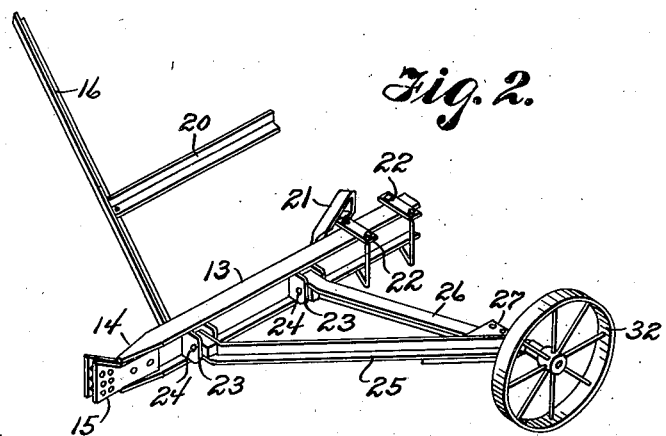
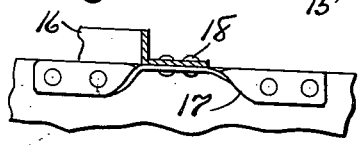
Harry Beebe
INVENTOR
BY Victor J. Evans & Co.
ATTORNEYS Patented May 18, 1937

2,081,083

UNITED STATES PATENT OFFICE 2,081,083

HITCH

Harry Beebe, Minneola, Kans.

Application October 12, 1936, Serial No. 105,301

2 Claims. (Cl. 97—235)

The invention relates to a hitch and more especially to a grain drill hitch for use with tractors.

The primary object of the invention is the provision of a hitch of this character, wherein several drills can be pulled by a tractor and the drills maintained in trailing alignment, particularly during the making of turns and without liability of causing the tractor to skid or pull sideways, the hitch being of novel construction and allows free flexibility of the grain drills, especially where several are being pulled by the tractor.

Another object of the invention is the provision of a hitch of this character that permits the making of sharp turns in either direction and maintains the trailing vehicle properly aligned and also it can be attached or removed easily and quickly.

A further object of the invention is the provision of a hitch of this character, which is simple in construction, thoroughly reliable and effective in its operation, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a plan view of a tractor hitch embodied by the present invention showing it attached to a tractor and two trailing grain drills.

Figure 2 is a perspective view of the tractor detached.

Figure 3 is a sectional view on the line 3—3 of Figure 1 looking in the direction of the arrows.

Similar reference characters indicate corresponding parts throughout the several views in the drawing.

Referring to the drawing in detail, A designates generally a portion of a tractor or other power driven vehicle of a similar type having at its rear a suitable draft device here disclosed as consisting of a flat horizontally disposed plate 10 provided with a series of holes 11 for receiving a connecting pin or bolt 12 adapted to be pulled by the tractor A, in this instance there is shown a pair of grain drills B and C, respectively, and the draft of these is had by a hitch constituting the present invention and hereinafter fully described.

The hitch comprises a draw bar 13 preferably in the form of an I-beam having at its front end, which is tapered at 14, a coupling 15 engaged by the pin or bolt 12, which, as previously stated, is adjustably secured in the holes 11 in the plate 10 to centralize the draft by the draw bar.

Bolted, riveted or otherwise secured in one channeled side of the bar 13 close to its front end is a rearwardly divergent substantially L-shaped arm 16 while to the frame of the drill B is secured a bracket 17, the arm 16 being riveted or otherwise fastened at 18 to this bracket while at the rearmost or extreme rear end of this arm is a fastener 19 for the attachment thereof to the frame of said drill B. Intermediate of the arm 16 and secured thereto is a brace 20 which is also fastened to the frame of the drill B. At the inner end of the frame of the drill B is an additional brace 21 which is made secure to the bar 13. This inner end of the said drill B carries a pair of clamps 22 which embrace the bar 13 and in this manner the said drill B is made firm and secure to the bar at one side thereof to be disposed laterally at right angles thereto.

Formed in the channel at the other side of the bar 13 is a pair of spaced bearings 23 to which are pivoted at 24 the inner ends of a pair of rearwardly angled convergent arms 25 and 26, respectively, which are riveted or otherwise made secure to a plate 27 having close to its rearmost edge spaced holes 28 in which is selectively engageable a pin or bolt 29 fitting a forwardly extending tongue 30 of the drill C. The plate 27 is fitted with an axle 31 carrying a ground wheel 32. It will be apparent from Figures 1 and 2 of the drawing that the arms 25 and 26 can be swung vertically on the horizontal pivots 24 connecting the same to the bearings 23 when the drill C is detached and not in use with the hitch.

By the construction and arrangement of the hitch hereinbefore described, one or several drills can be pulled by a tractor and sharp turns made without side sliding of either the tractor or the drills when in use. The pivoted arms 25 and 26 assure flexibility in the coupling of the drill C and the ground wheel 32 affords a front caster to the said drill C when pulled in association with the drill B and the tractor.

What is claimed is:

1. The combination of a draw bar, a braced arm carried at one side of the bar for attachment to a grain drill, means for bracing the drill when attached to said arm, clamps for fastening the said drill to the draw bar, a horizontally pivoted extension at the other side of said bar and having a ground wheel, an attaching plate carried by said extension, and means for selectively coupling a second drill with said plate.

2. The combination of a draw bar, a braced arm carried at one side of the bar for attachment to a grain drill, means for bracing the drill when attached to said arm, clamps for fastening the said drill to the draw bar, a horizontally pivoted extension at the other side of said bar and having a ground wheel, an attaching plate carried by said extension, means for selectively coupling a second drill with said plate, and means for coupling the forward end of the draw bar with a draft vehicle.

HARRY BEEBE.